INVENTOR.
DAVID R. WILLIAMS
BY Knox & Knox

INVENTOR.
DAVID R. WILLIAMS
BY Knox & Knox

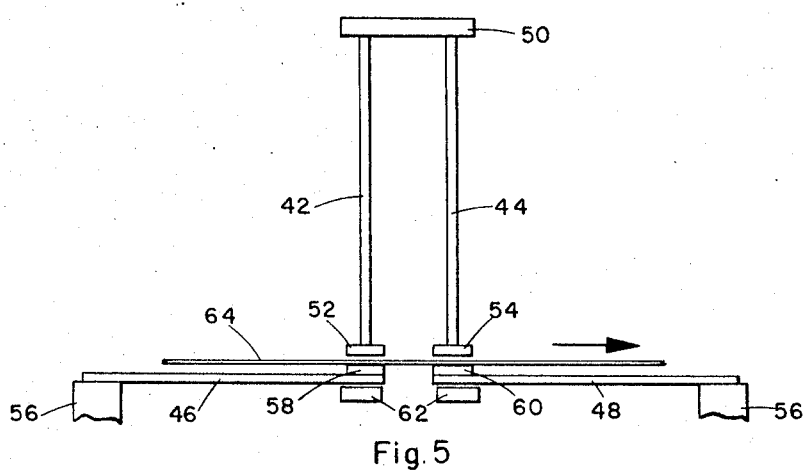
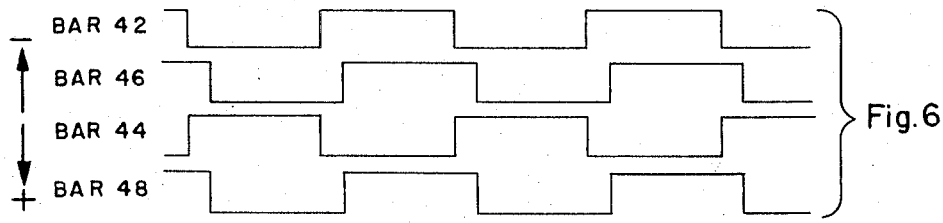
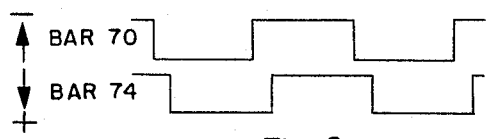
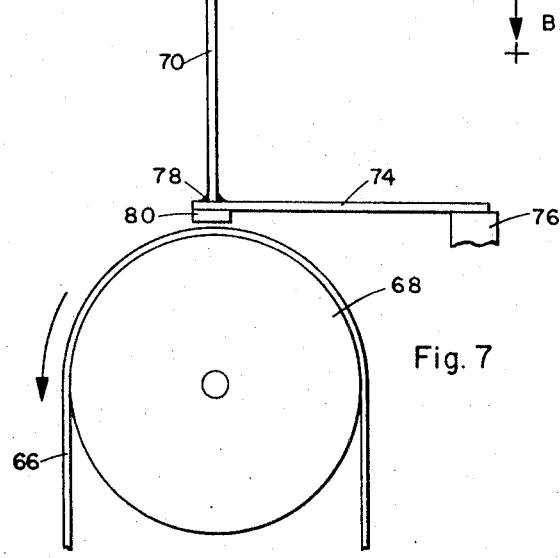

United States Patent Office 3,454,206
Patented July 8, 1969

3,454,206
ELECTROSTRICTIVE INCREMENTAL FILM DRIVE
David R. Williams, Cardiff, Calif., assignor to The Ryan Aeronautical Co., San Diego, Calif.
Filed Nov. 13, 1967, Ser. No. 682,144
Int. Cl. B65h 17/36, 17/22
U.S. Cl. 226—162                             8 Claims

ABSTRACT OF THE DISCLOSURE

The apparatus utilizes a piezoelectric ceramic which has the ability to contract or expand when negative or positive voltages are applied in the direction of polarization of the material. Bars of the material are arranged physically so that one or more clamper bars will alternately hold or clamp the film to a driver bar which contracts and expands in the direction of motion of the film. Any number of combinations of clamper and driver bars may be used to achieve the speeds or motion desired. The ceramic bars are driven electrically with a square wave form, with the clamper bars driven slightly ahead of the driver bars to insure maximum clamping pressure and film movement. By varying the phase relationship of the clamper wave form and the driver wave form, a change in film direction is obtained.

Background of the invention

The present invention relates to the transporting or micropositioning of film, tape or paper and specifically to an electrostrictive incremental film drive.

Highly accurate film drives of the sprocketless type in particular usually involve some mechanical means for gripping and advancing the film in a continuous motion. Such mechanisms include large torque motor driven capstans with pinch rollers and very elaborate motion sensing feedback circuits and associated hardware. The power requirements and costs are high and the precision of the device is degraded by environmental extremes.

Summary of the invention

The film drive described herein utilizes the lengthwise displacement of an elongated bar of lead zirconate titanate, a polycrystalline ceramic. This material will contract or expand in length when subjected to a voltage in the direction of polarization of the material. The film is placed adjacent to a bar of the material which is then energized by timed voltage pulses to contract and expand in the direction of the film travel. Simultaneously two other bars of the material are alternately energized by properly timed pulses of voltage to clamp the film to the ends of the first bar and in synchronization with the motions of the first bar. By suitable timing of the pulses the film can be moved in either direction in increments equal to the change in length of the film moving bar and at a speed determined by the pulse rate. There are no mechanical devices involved, the only motions being contraction and expansion of the ceramic bars. The only wear occurs at the contact faces of the bars with the film and is negligible.

Brief description of the drawings

FIGURE 5 is a diagram of a dual drive form of the system;
FIGURE 6 is a graphic representation of the pulse timing for the structure of FIGURE 5;
FIGURE 7 is a diagram of a rotary form of the drive;
and
FIGURE 8 is a graphic representation of the pulse timing for the structure of FIGURE 7.

Similar characters of reference indicate similar or identical elements and portions throughout the specification and throughout the views of the drawings.

Description of the preferred embodiment

The material which makes the film drive practical is a polycrystalline lead zirconate titanate ceramic, having the property of expanding and contracting in length when a voltage is applied in the direction of polarization. The positive portion of the square wave drive pulse energizes the piece to its fully extended position while the negative portion drives it to its fully contracted position. The maximum voltage needed is 30–50 volts per .001 inch of thickness of the material and the total displacement at maximum drive voltages is approximately 0.001 inch per inch of length of the material. A piece or bar of the ceramic material three inches long would thus have a useful motion of 0.003 inch, as an example. Since the motions are very small, the incremental motion of the film can be controlled very accurately, yet speed is variable over a very wide range by changing the voltage pulse rate or amplitude.

Figure 1:
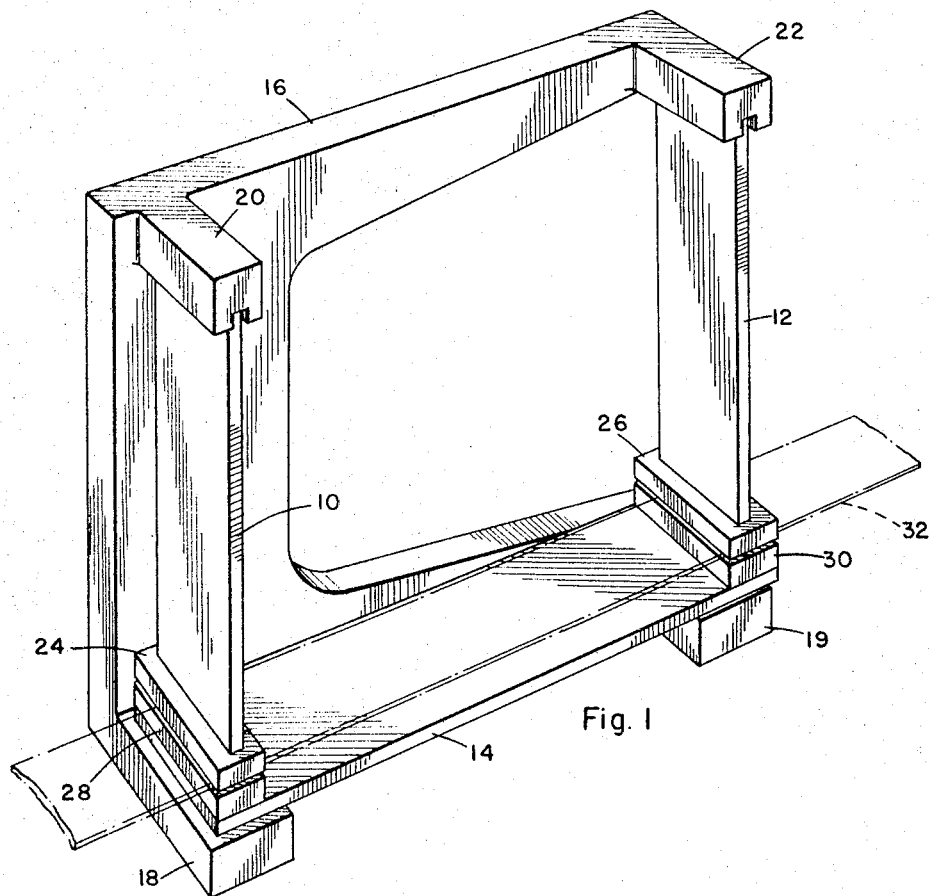
FIGURE 1 is a perspective view of the unit in a pictorial form for clarity.

In the simple form of the apparatus illustrated three pieces of the ceramic material are used, comprising a pair of clamp bars 10 and 12 and a driver bar 14, the bars being polarized in their crystalline structure so that maximum contraction occurs lengthwise. Each bar is secured at one end to a fixed support, FIGURE 1 showing a simple unitary frame 16 having lower arms 18 and 19 on which transport bar 14 is supported, and a pair of upper arms 20 and 22 from which bars 10 and 12 are suspended. Bar 14 is secured to lower arm 18 only, the arm 19 merely supporting the bar while allowing it to contract and expand. Any suitable adhesive or clamping means may be used to secure the bars to their supports. Clamp bars 10 and 12 are perpendicular to driver bar 14 and spaced above the opposite ends of the driver bar. To provide ample gripping surface area, the lower ends of bars 10 and 12 are fitted with shoes 24 and 26, respectively, and opposing shoes 28 and 30 are secured on the corresponding upper side of driver bar 14. The shoes are of a suitable material and surface roughness which can provide maximum gripping of the film without causing scratching or other damage. Since the actual gaps and motions are very small, these are greatly exaggerated in the drawings for clarity.

Figure 2:
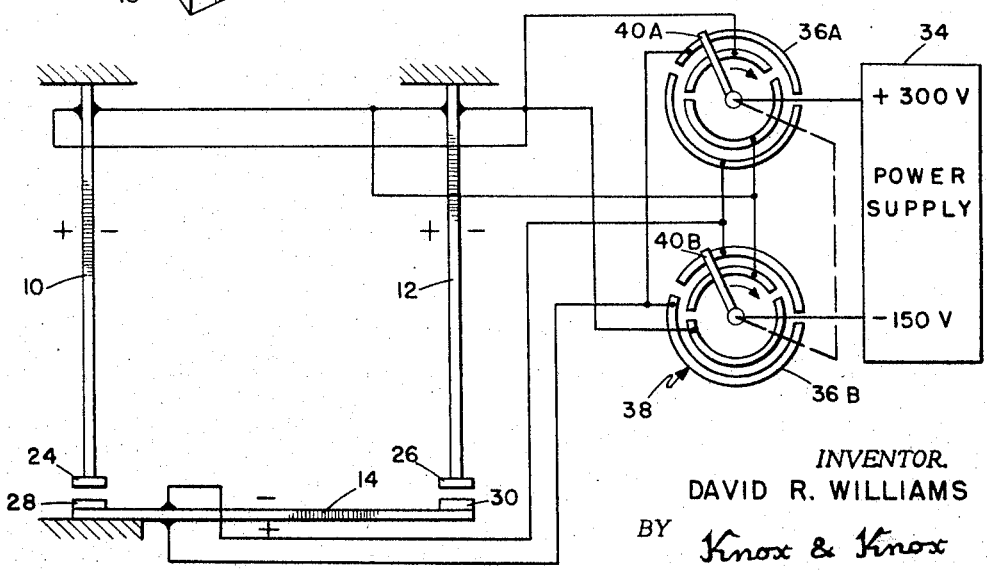
FIGURE 2 is a diagram of one arrangement of circuitry.

The drive unit is actuated by a suitable power supply 34 controlled by rotary switches 36A and 36B of a sequential switching unit 38, as in FIGURE 2. Each of the bars 10, 12 and 14 is connected through the contacts of the sequential switching unit to power supply 34. The moving contacts 40A and 40B sweep the fixed contacts to provide a sequence of electrical pulses as hereinafter described. A positive pulse causes a bar to expand, while a negative pulse causes contraction, the respective polarities being indicated for the particular switch position shown. It should be understood that the rotary switch is shown for simplicity and is merely symbolic. For the purpose and performance intended for the drive unit, it is more desirable to use electronic means, such as transistorized switching and timing circuits. Such circuits are well known and can be arranged to provide any required sequence and time relationships desired.

Figure 3A:
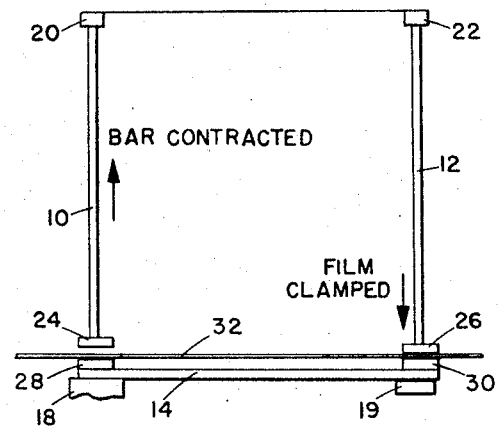
FIGURES 3a–3d show the significant steps of the operation during one cycle of motion.
Figure 3B:
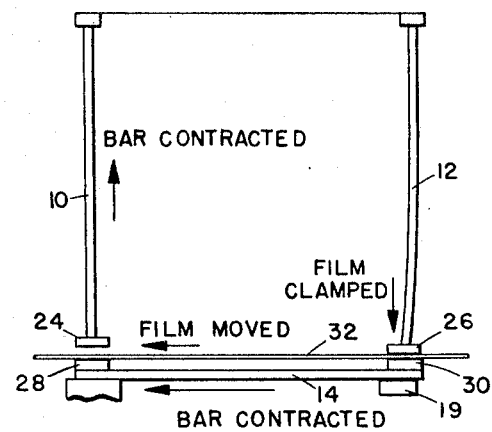
Figure 3C:
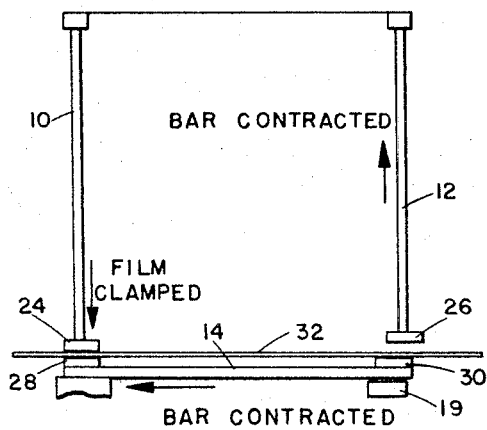
Figure 3D:
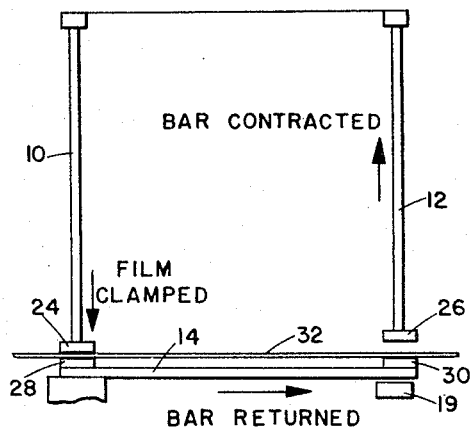
Figure 4:
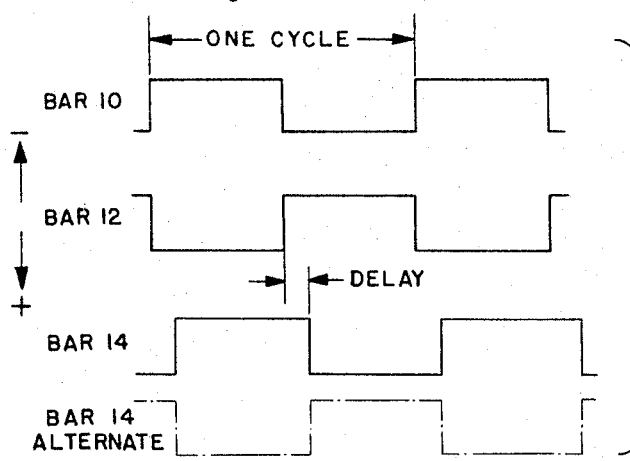
FIGURE 4 is a graphic representation of the electrical pulse timing.

Basically, the clamp bars 10 and 12 are driven alternately, slightly in advance of driver bar 14, as indicated in the pulse timing diagram in FIGURE 4. Taken with the sequential actions shown in FIGURES 3a–3d, the operation is readily understood. In the initial position in FIGURE 3a, the clamp bar 10 is in its contracted position to release pressure on film 32. At the same time clamp bar 12 is driven to its extended position and the film is held between shoes 26 and 30. Driver bar 14 is supported at this position in the cycle by arm 19 but is still allowed to move in the desired direction.

Driver bar 14 is now driven into contraction, as in FIGURE 3b, pulling the clamped film from right to left. The slight possible bending of clamp bar 12 is accommodated by the natural resiliency of the material and is only a matter of a few thousandths of an inch at the lower end. Film 32 slides over shoe 28 as the driver bar contracts. With the driver bar still in this position, clamp bar 10 is driven into expansion to clamp the film between shoes 24 and 28, while clamp bar 12 is driven into contraction to release the film, as in FIGURE 3c. Driver bar 14 is then expanded and returns to previous position, leaving the film clamped by clamp bar 10, as in FIGURE 3d. The delay in the driving voltage wave form of driver bar 14 relative to clamp bars 10 and 12 is indicated in FIGURE 4. Reversal of the film movement is possible by changing the drive pulse for bar 14 to that shown in broken line in FIGURE 4. It is obvious that repetition of the above sequence will result in motion of the film from right to left in increments equal to the effective movement of the driver bar. Speed is readily controlled by the rate of repetition of the pulse sequence, or the voltages applied to the driver bar.

The arrangement shown in FIGURE 5 is a dual driver system which doubles the speed of film advancement for a given pulsing rate of each driver. A pair of clamp bars 42 and 44 operate alternately in conjunction with a pair of driver bars 46 and 48, the clamp bars being fixed at one end to a structural element 50 and extending in close parallel relation, with gripping shoes 52 and 54, respectively, on their other ends. Driver bars 46 and 48 are each fixed at one end to a structural element 56 and are in opposed, coplanar relation, with shoes 58 and 60 on their respective ends immediately opposite shoes 52 and 54. The free ends of driver bars 46 and 48 rest on fixed supports 62 under clamping loads. Film 64 passes over shoes 58 and 60 in the longitudinal direction of the driver bars.

With the pulse timing sequence indicated in FIGURE 6, film 64 will be moved from left to right, as indicated by the directional arrow in FIGURE 5. First the clamp bar 42 is driven to expansion to clamp the film between shoes 52 and 58, then driver bar 46 is driven to expansion to move the film to the right. Clamp bar 42 is then driven to contraction to release the film, while clamp bar 44 is simultaneously driven to expansion to clamp the film between shoes 54 and 60. Driver bar 48, which has been held in expanded position, is then contracted to pull the film again to the right, while driver bar 46 is driven to contraction in readiness for the next cycle. Clamp bars 42 and 44 thus alternately clamp slightly ahead of the alternating motion of driver bars 46 and 48 in a common direction, which depends on phasing.

A further configuration is shown in FIGURE 7, in which the drive is applied to a film 66 passing over or around a rotatable drum 68. A clamp bar 70 extends from a fixed structural element 72 substantially radial to drum 68 and a driver bar 74 extends from a fixed support 76 tangential to the drum. The unsupported ends of the two bars are secured together by any suitable means, such as adhesive 78, and a single gripping shoe 80 is secured to driver bar 74 on the face adjacent the drum to engage the film when clamp bar 70 is expanded.

The pulse timing for producing the counterclockwise rotation indicated is shown in FIGURE 8. Clamp bar 70 is driven into expansion to grip film 66 between the shoe 80 and drum 68. Then driver bar 74 is driven into expansion to impart an increment of rotation to the drum and film, after which clamp bar 70 is driven into contraction. With the shoe 80 clear of the film, the driver bar is driven into contraction ready for the next cycle. Again, the clamp bar is driven slightly ahead of the driver bar to ensure proper clamping and release actions before the driver bar moves. Several connected sets of clamp and driver bars as shown could be used around the circumference of the drum, with sequential phasing, similar to that represented in FIGURE 6, to increase speed if desired.

Since there is a minimum of moving parts, a high degree of reliability can be obtained. The lack of mechanical parts also minimizes the unit's sensitivity to shock, vibration and other environmental conditions. These factors, together with its small size and light weight, make the unit particularly adaptable to use in aircraft or spacecraft, while the reliability enables the unit to be operated for a considerable time without adjustment or maintenance.

The term "film" is intended to include any strip material, such as paper, plastic, or the like, which is fed from one location to another.

It is understood that minor variation from the form of the invention disclosed herein may be made without departure from the spirit and scope of the invention.

I claim:

1. An incremental film drive, comprising:
   a supporting structure;
   an elongated driver bar of electrostrictive material having the property of contracting and expanding lengthwise when electrically energized with voltages of negative and positive polarities respectively, one end of said driver bar being fixed to said supporting structure;
   electrical power supply means connected to said driver bar for energizing the bar at timed intervals with voltage pulses of alternating opposite polarities;
   and clamp means adjacent at least one end of said driver bar to clamp a film against a portion of the driver bar, said clamp means being operable to clamp and release the film alternately in synchronization with the motions of said driver bar.

2. The structure of claim 1, wherein said clamp means comprises at least one elongated bar of electrostrictive material fixed at one end to said supporting structure and extending substantially perpendicular to the free end of said driver bar, the free end of said clamp bar being sufficiently close to said driver bar to clamp a film therebetween when expanded and release the film when contracted;
   said power supply means being connected to said clamp bar to energize the clamp bar with voltage pulses of alternating polarity in synchronization with the pulses applied to said driver bar.

3. The structure of claim 2, wherein said power supply means includes sequential switching means timed to energize said clamp bar slightly before said driver bar, whereby the film is alternately clamped and released before each motion of said driver bar.

4. The structure of claim 1, wherein said clamp means comprises a pair of elongated bars of electrostrictive material, each fixed at one end to said supporting structure and extending substantially perpendicular to opposite ends of said driver bar, the free ends of said clamp bars being sufficiently close to said driver bar to clamp a film therebetween when expanded and release the film when contracted.

5. The structure of claim 4, wherein said power supply means includes sequential switching means timed to energize said clamp bars alternately slightly before energizing said driver bar, whereby the appropriate end of the film is alternately clamped and released before each associated motion of said driver bar.

6. The structure of claim 4, and including film gripping shoes on the free ends of said clamp bars and corresponding opposing shoes on said driver bar.

7. The structure of claim 4, wherein said driver bar and clamp bars are of lead zirconate titanate polycrystalline ceramic material.

8. The structure of claim 1, wherein said clamp means comprises an elongated clamp bar of electrostrictive material having one end fixed to said supporting structure and the other end secured to the end of said driver bar remote from the supporting structure, with said clamp bar substantially perpendicular to the driver bar;

and a movable film supporting element mounted adjacent said driver bar at the junction with and on the opposite side to said clamp bar, whereby expansion of the clamp bar clamps the film against said supporting element.

References Cited

UNITED STATES PATENTS

| | | | |
|---|---|---|---|
| 3,297,889 | 1/1967 | Breskend | 310—8.6 |
| 3,315,103 | 4/1967 | Duff et al. | 310—8.6 X |
| 3,396,890 | 8/1968 | Fulton | 226—190 X |

ALLEN N. KNOWLES, *Primary Examiner.*

U.S. Cl. X.R.

226—188; 310—8.6